United States Patent
Tsuchiya et al.

(10) Patent No.: US 12,466,348 B2
(45) Date of Patent: Nov. 11, 2025

(54) ON-VEHICLE CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Junji Tsuchiya, Osaka (JP); Takafumi Kawakami, Osaka (JP); Seiji Takahashi, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 38 days.

(21) Appl. No.: 18/564,524

(22) PCT Filed: May 23, 2022

(86) PCT No.: PCT/JP2022/021085
§ 371 (c)(1),
(2) Date: Nov. 27, 2023

(87) PCT Pub. No.: WO2022/250008
PCT Pub. Date: Dec. 1, 2022

(65) Prior Publication Data
US 2025/0083628 A1    Mar. 13, 2025

(30) Foreign Application Priority Data
May 25, 2021   (JP) .................. 2021-087410

(51) Int. Cl.
*B60R 16/03*    (2006.01)
*B60R 16/023*   (2006.01)
*H02H 3/10*     (2006.01)

(52) U.S. Cl.
CPC .......... *B60R 16/03* (2013.01); *B60R 16/0231* (2013.01); *H02H 3/10* (2013.01)

(58) Field of Classification Search
CPC ........ B60R 16/03; B60R 16/0231; H02H 3/10
See application file for complete search history.

(56) References Cited

U.S. PATENT DOCUMENTS

2012/0169284 A1* 7/2012 Park ..................... H02J 7/04
                                                  320/112
2019/0173274 A1* 6/2019 Fukae .................. H01M 10/44
(Continued)

FOREIGN PATENT DOCUMENTS

JP    2009-232588 A    10/2012
JP    2015-35951 A     2/2015
(Continued)

OTHER PUBLICATIONS

International Search Report, Application No. PCT/JP2022/021085 mailed Jan. 12, 2022. ISA/Japan Patent Office.

*Primary Examiner* — Lincoln D Donovan
*Assistant Examiner* — Alex W Lam
(74) *Attorney, Agent, or Firm* — Honigman LLP

(57) ABSTRACT

An on-vehicle control device (1) includes a control unit (14). The control unit (14) switches a block unit (11) to a blocking state based on a first blocking characteristic (BC1). A relay (10) is turned off based on a second blocking characteristic (BC2). In the second blocking characteristic (BC2), a time decreases with a first degree of decrease as a current value increases. In the first blocking characteristic (BC1), a time decreases with a second degree of decrease in a first current value range (R1) as the current value increases, and a time decreases with a third degree of decrease in a second current value range (R2) as the current value increases. The time is set to be longer in the first blocking characteristic (BC1) than in the second blocking characteristic (BC2) for the current (Continued)

value smaller than a threshold (Ith). The time is set to be shorter in the first blocking characteristic (BC1) than in the second blocking characteristic (BC2) for a current value larger than the threshold (Ith).

7 Claims, 2 Drawing Sheets

(56) References Cited

U.S. PATENT DOCUMENTS

| | | | |
|---|---|---|---|
| 2020/0233441 A1* | 7/2020 | Morimoto | B60L 3/0076 |
| 2021/0135664 A1* | 5/2021 | Rupp | H03K 17/162 |
| 2022/0017054 A1* | 1/2022 | Suelzle | B60T 17/02 |

FOREIGN PATENT DOCUMENTS

| | | |
|---|---|---|
| WO | 2020026859 A1 | 2/2020 |
| WO | 2021010007 A1 | 1/2021 |

* cited by examiner

ON-VEHICLE CONTROL DEVICE

CROSS-REFERENCE TO RELATED APPLICATIONS

This application is the U.S. national stage of PCT/JP2022/021085 filed May 23, 2022, which claims priority of Japanese Patent Application No. 2021-087410 filed on May 25, 2021, the contents of which are incorporated herein.

TECHNICAL FIELD

The present disclosure relates to an on-vehicle control device.

BACKGROUND

The background art of JP 2021-087410 discloses a load circuit that supplies power to a load. The load circuit includes a battery and a relay (semiconductor switch) provided between the battery and the load, and allows switching between driving and stopping of the load by on-off operation of the relay. The load circuit further includes a fuse that blocks a power path when an overcurrent flows through the load.

SUMMARY

In the technology described above, when the fuse is selected based on a maximum value of current desired to flow through a path, blocking may not be able to be appropriately performed in a state where the current value is low, which may cause smoking of the relay and the like. Therefore, it is conceivable to adopt a configuration in which the relay is blocked on the basis of a predetermined blocking characteristic and thereby block the power path appropriately by the relay in a state where the current value is low. In a case where this configuration is adopted, however, in order to allow a larger current to flow, it is necessary to increase both the fuse and the relay in size.

The present disclosure provides a technology capable of allowing a larger current to flow while suppressing an increase in size of a relay.

Solutions to Problems

An on-vehicle control device of the present disclosure is an on-vehicle control device used in an on-vehicle system including a power source unit, a power path to which power based on the power source unit is supplied, a relay provided in the power path, and a block unit provided in the power path. The on-vehicle control device includes a control unit that switches the block unit to a blocking state on the basis of a first blocking characteristic. The relay is turned off on the basis of a second blocking characteristic. The first blocking characteristic and the second blocking characteristic are characteristics defining a correspondence relationship between a current value and a time until blocking. In the second blocking characteristic, the time decreases with a first degree of decrease as the current value increases. In the first blocking characteristic, the time decreases with a second degree of decrease in a first current value range as the current value increases, and the time decreases with a third degree of decrease in a second current value range which is larger than an upper limit value of the first current value range, as the current value increases. The second degree of decrease and the third degree of decrease are larger than the first degree of decrease. The third degree of decrease is smaller than the second degree of decrease. The time is set to be longer in the first blocking characteristic than in the second blocking characteristic for the current value smaller than a threshold set between a lower limit value of the first current value range and an upper limit value of the second current value range. The time is set to be shorter in the first blocking characteristic than in the second blocking characteristic for the current value larger than the threshold.

According to the present disclosure, it is possible to allow a larger current to flow while suppressing an increase in size of the relay.

DETAILED DESCRIPTION OF PREFERRED EMBODIMENTS

Figure 1:
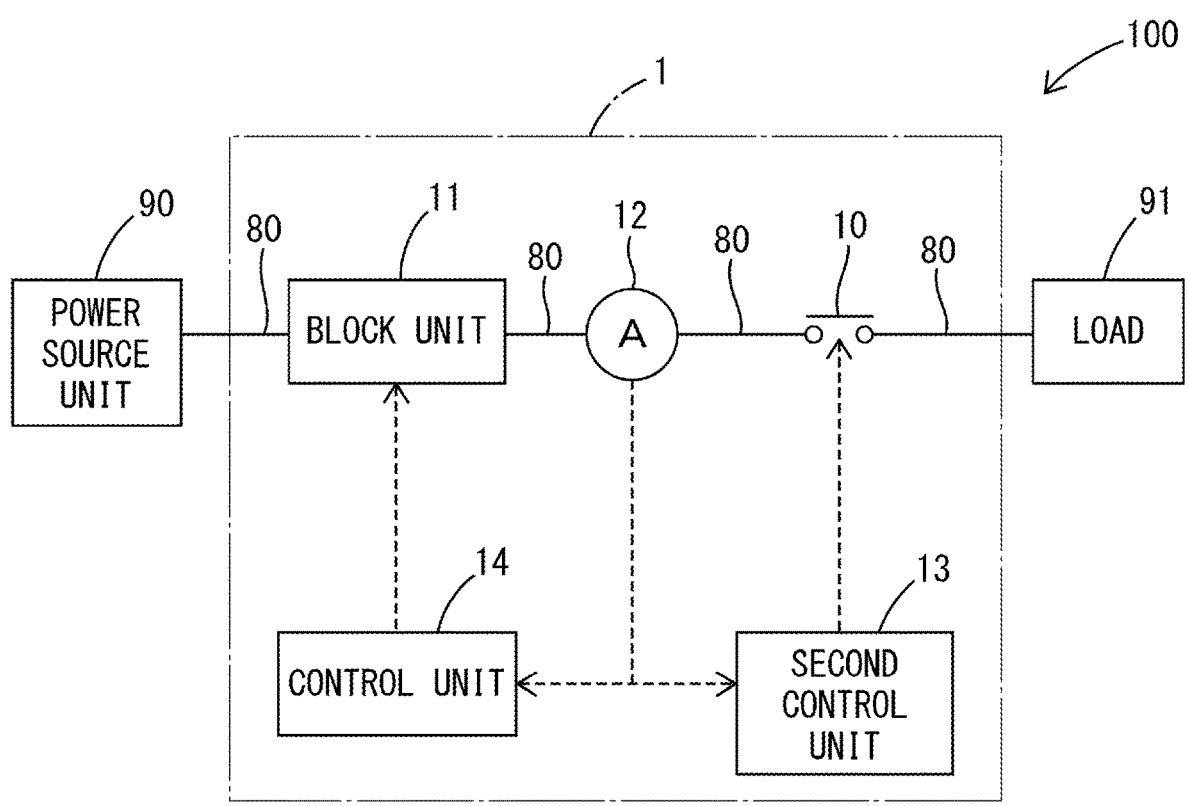
FIG. 1 is a circuit diagram schematically illustrating a configuration of an on-vehicle system according to a first embodiment.

Hereinafter, embodiments of the present disclosure will be listed and illustrated.

[1] An on-vehicle control device used in an on-vehicle system including a power source unit, a power path to which power based on the power source unit is supplied, a relay provided in the power path, and a block unit provided in the power path, the on-vehicle control device including: a control unit that switches the block unit to a blocking state on the basis of a first blocking characteristic, in which the relay is turned off on the basis of a second blocking characteristic, the first blocking characteristic and the second blocking characteristic are characteristics defining a correspondence relationship between a current value and a time until blocking, in the second blocking characteristic, the time decreases with a first degree of decrease as the current value increases, in the first blocking characteristic, the time decreases with a second degree of decrease in a first current value range as the current value increases, and the time decreases with a third degree of decrease in a second current value range which is larger than an upper limit value of the first current value range as the current value increases, the second degree of decrease and the third degree of decrease are larger than the first degree of decrease, the third degree of decrease is smaller than the second degree of decrease, the time is set to be longer in the first blocking characteristic than in the second blocking characteristic for the current value smaller than a threshold set between a lower limit value of the first current value range and an upper limit value of the second current value range, and the time is set to be shorter in the first blocking characteristic than in the second blocking characteristic for the current value larger than the threshold.

With this configuration, in a state where the value of the current flowing through the power path is smaller than the threshold, blocking by the relay is prioritized, and in a state where the value of the current flowing through the power path is larger than the threshold, blocking by the block unit is prioritized. Moreover, in a state where the value of the current flowing through the power path is larger than the threshold, the degree of decrease of the time of the first blocking characteristic is smaller in the second current value range than in the first current value range. Therefore, a maximum value of the current flowing through the power path can be increased without changing the second blocking characteristic for blocking the relay. Therefore, it is possible to allow a larger current to flow while suppressing an increase in size of the relay.

[2] The on-vehicle control device according to [1], in which the threshold is a value between an upper limit value of the first current value range and a lower limit value of the second current value range.

With this configuration, the time of the first blocking characteristic can be decreased with the second degree of decrease in a range of the current value in which blocking by the relay is prioritized, and the time of the first blocking characteristic can be decreased with the third degree of decrease in a range of the current value in which blocking by the block unit is prioritized. Therefore, in the range of the current value in which blocking by the relay is prioritized, blocking by the block unit can be prevented from being erroneously performed first. In addition, in the range of the current value in which blocking by the block unit is prioritized, the maximum value of the current value of the first blocking characteristic can be extended more greatly.

[3] The on-vehicle control device according to [1] or [2], in which the control unit immediately switches the block unit to the blocking state when a value of the current flowing through the power path exceeds a second threshold larger than the threshold.

With this configuration, the power path can be immediately blocked in a case where a large current that should not be allowed flows even for a short time.

[4] The on-vehicle control device according to any one of [1] to [3], in which the relay is a mechanical relay, and the block unit is a semiconductor switching element.

With this configuration, a configuration in which an increase in cost of the relay can be suppressed and the degree of decrease of time of the first blocking characteristic changes according to the range of the current value can be provided more accurately by the block unit.

[5] The on-vehicle control device according to any one of [1] to [3], in which the block unit is a pyrofuse.

With this configuration, since the power path is blocked by being physically cut off, the power path can be more reliably blocked.

[6] The on-vehicle control device according to any one of [1] to [5], in which the first blocking characteristic and the second blocking characteristic are defined by a linear function having the current value and the time as variables.

With this configuration, the data amount of the first blocking characteristic and the second blocking characteristic can be made small as compared with the configuration prescribed by a table method.

First Embodiment

An on-vehicle system 100 illustrated in FIG. 1 is a system mounted on a vehicle. The on-vehicle system 100 includes a power source unit 90, a load 91, a power path 80 which supplies power based on the power source unit 90 to the load 91, and an on-vehicle control device 1.

The power source unit 90 is, for example, a battery, more specifically, a lead battery, a lithium ion battery, or the like. The load 91 is an electronic device provided in the vehicle. Each of the power source unit 90 and the load 91 is electrically connected to the power path 80. The power based on the power source unit 90 is supplied to the power path 80 and is supplied to the load 91 via the power path 80.

The on-vehicle control device 1 includes a relay 10, a block unit 11, a current detection unit 12, a second control unit 13, and a control unit 14.

The relay 10 is provided in the power path 80. The relay 10 is, for example, a mechanical relay. The operation of the relay 10 is controlled by the second control unit 13. The relay 10 is turned on to allow power supply from the power source unit 90 side to the load 91 side, and is turned off to block power supply from the power source unit 90 side to the load 91 side.

The block unit 11 is provided in the power path 80. The block unit 11 is provided in series with the relay 10 and is disposed closer to the power source unit 90 than the relay 10. The block unit 11 can switch from an allowable state which allows power supply from the power source unit 90 side to the load 91 side to a blocking state which blocks power supply from the power source unit 90 side to the load 91 side. The block unit 11 can return to the allowable state from the blocking state. The operation of block unit 11 is controlled by the control unit 14. In the present embodiment, the block unit 11 is a semiconductor switching element.

The current detection unit 12 detects the value of the current flowing through the power path 80. More specifically, the current detection unit 12 detects a current flowing through a path between the relay 10 and the block unit 11 in the power path 80. The current detection unit 12 includes, for example, a shunt resistor provided in the power path 80 and a differential amplifier that amplifies and outputs a voltage between both ends of the shunt resistor. The detection value of the current detection unit 12 is input to each of the second control unit 13 and the control unit 14.

Each of the second control unit 13 and the control unit 14 is configured as an ECU, and includes a CPU, a ROM, a RAM, and the like. The second control unit 13 controls the operation of the relay 10. The control unit 14 switches the block unit 11 to the blocking state on the basis of a first blocking characteristic BC1. The block unit 11 is blocked when an overcurrent flows through the power path 80, and is normally in the allowable state. The second control unit 13 turns on the relay 10 when a predefined drive start condition is satisfied. As a result, power based on the power source unit 90 is supplied to the load 91. The drive start condition may be, for example, completion of a predefined drive start operation by the driver, or may be another condition. The second control unit 13 turns off the relay 10 when a predefined drive stop condition is satisfied. As a result, power supply to the load 91 is blocked. The drive stop condition may be, for example, completion of a predefined drive stop operation by the driver, or may be another condition. After turning on the relay 10, the second control unit 13 switches the relay 10 to the off state on the basis of a second blocking characteristic BC2 even when the drive stop condition is not satisfied. That is, the relay 10 is blocked on the basis of the second blocking characteristic BC2.

Figure 2:
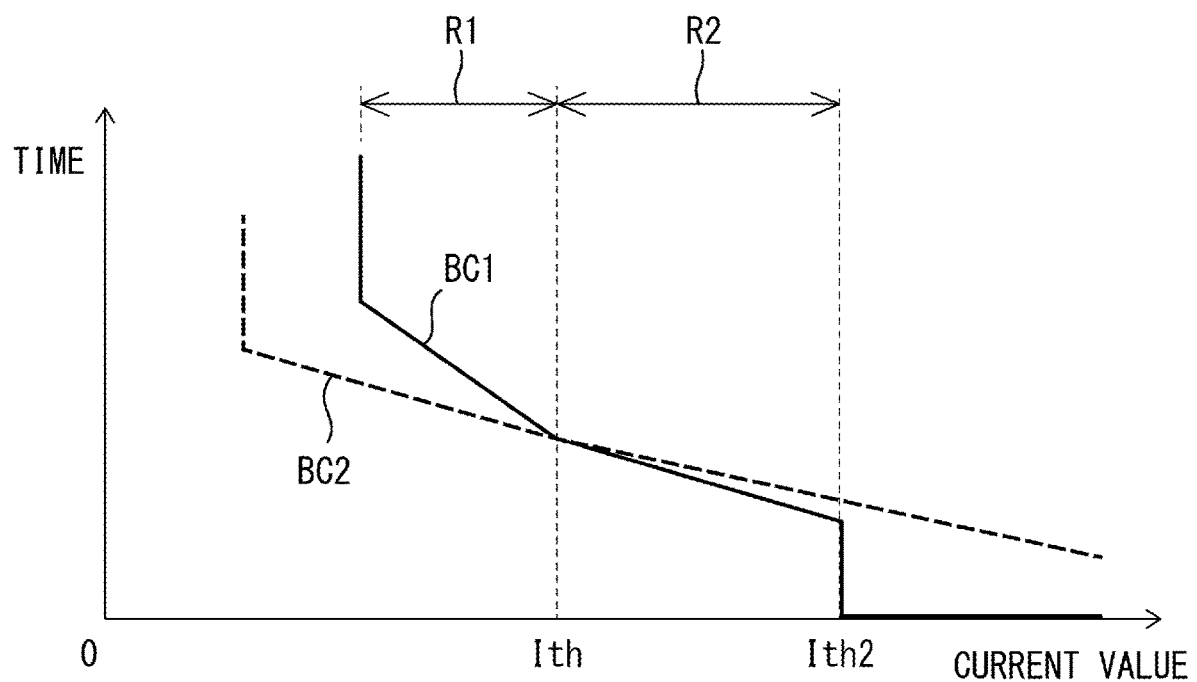
FIG. 2 is an explanatory diagram conceptually illustrating a first blocking characteristic and a second blocking characteristic.

The first blocking characteristic BC1 and the second blocking characteristic BC2 are characteristics defining a correspondence relationship between a current value and a time until blocking. More specifically, the first blocking characteristic BC1 and the second blocking characteristic BC2 are characteristics that define a correspondence relationship between a current value and a time for blocking when a state of exceeding the current value continues. The first blocking characteristic BC1 and the second blocking characteristic BC2 are prescribed in a range where the current value is larger than 0 A. As illustrated in FIG. 2, as the current value increases, the corresponding times of the first blocking characteristic BC1 and the second blocking characteristic BC2 decrease. In the first blocking characteristic BC1, as the current value increases, the corresponding time decreases with the first degree of decrease. In the second blocking characteristic BC2, in a first current value range R1, the corresponding time decreases with the second degree of decrease as the current value increases, and in a second current value range R2 larger than the upper limit value of the first current value range R1, the corresponding time decreases with the third degree of decrease as the current value increases. The first blocking characteristic BC1 is prescribed in at least a part of the first current value range R1 and at least a part of the second current value range R2. The second degree of decrease and the third degree of decrease are larger than the first degree of decrease. The third degree of decrease is smaller than the second degree of decrease. Each of the first degree of decrease, the second degree of decrease, and the third degree of decrease is constant.

A threshold Ith is set between the lower limit value of the first current value range R1 and the upper limit value of the second current value range R2. In the present embodiment, the threshold Ith is set between the upper limit value of the first current value range R1 and the lower limit value of the second current value range R2. The first current value range R1 and the second current value range R2 are continuous with the threshold Ith interposed therebetween. The lower limit value of the first current value range R1 is a value larger than 0.

In the first blocking characteristic BC1, a time longer than that of the second blocking characteristic BC2 is set for a current value smaller than the threshold Ith. That is, when the value of the current flowing through the power path 80 is smaller than the threshold Ith, the relay 10 is blocked earlier than the block unit 11. Furthermore, in the second blocking characteristic BC2, the time is set such that smoking of the relay 10 does not occur at a current value smaller than the threshold Ith. Therefore, in a state where the value of the current flowing through the power path 80 is smaller than the threshold Ith, the relay 10 is blocked before smoking of the relay 10 occurs.

In the first blocking characteristic BC1, a time shorter than that of the second blocking characteristic BC2 is set for a current value larger than the threshold Ith. That is, when the value of the current flowing through the power path 80 is larger than the threshold Ith, the block unit 11 is blocked earlier than the relay 10. For example, the threshold Ith is set to a value smaller than a current value at which blocking by the relay 10 is difficult. In this case, even when the value of the current flowing through the power path 80 is larger than the threshold Ith, blocking can be performed by the block unit 11 faster more reliably than the relay 10.

The first blocking characteristic BC1 and the second blocking characteristic BC2 are defined by a linear function having a current value and a time as variables. For example, the relationship between the current value and the time of the first blocking characteristic BC1 in the first current value range R1 is expressed by the following Expression (1). The relationship between the current value and the time of the first blocking characteristic BC1 in the second current value range R2 is expressed by the following Expression (2). The relationship between the current value and the time of the second blocking characteristic BC2 is expressed by the following Expression (3).

$$Y1 = A1 \cdot X1 + B1 \quad \text{Expression (1)}$$
$$Y2 = A2 \cdot X2 + B2 \quad \text{Expression (2)}$$
$$Y3 = A3 \cdot X3 + B3 \quad \text{Expression (3)}$$

X1, X2, and X3 are current values, and are values larger than 0. Y1, Y2, and Y3 are times, and are values larger than 0. A1, A2, and A3 are slopes and values smaller than 0. B1, B2, and B3 are constants, and are values larger than 0.

A1 and A2 are values smaller than A3. A2 is a value larger than A1. The threshold Ith is an intersection of Expressions (1), (2), and (3).

The following description relates to a specific example of blocking the block unit 11 on the basis of the first blocking characteristic BC1. The control unit 14 decomposes the current value defined by the first blocking characteristic BC1 into multiple current values with a predetermined resolution. Then, the control unit 14 judges whether or not the value of the current flowing through the power path 80 exceeds each of the decomposed multiple current values, and, when the value exceeds, the control unit 14 operates a timer corresponding to the current value that exceeds the value. Then, when the operation time of the timer reaches the time corresponding to the current value without falling below the current value, the control unit 14 switches the block unit 11 to the blocking state. On the other hand, when the value of the current flowing through the power path 80 falls below the current value before the operation time of the timer reaches the time corresponding to the current value, the control unit 14 resets the timer. In a case where the value of the current flowing through the power path 80 exceeds the decomposed current values, the control unit 14 operates the respective timers for the exceeded current values and performs similar processing. Processing of blocking the relay 10 on the basis of the second blocking characteristic BC2 is performed similarly to the processing of blocking the block unit 11 on the basis of the first blocking characteristic BC1.

When the value of the current flowing through the power path 80 exceeds a second threshold Ith2 larger than the threshold Ith, the control unit 14 immediately switches the block unit 11 to the blocking state. The second threshold Ith2 is the same value as the upper limit value of the second current value range R2. The second threshold Ith2 is set, for example, in a range of current value at which explosion of the relay 10 does not occurs. In the first blocking characteristic BC1, "0" or "substantially 0 (for example, 1/10 of a time corresponding to the upper limit value of the second current value range R2 in the first blocking characteristic BC1, or less)" is set as a time corresponding to a current value exceeding the second threshold Ith2. With this configuration, explosion of the relay 10 can be prevented.

The following description relates to effects of the first embodiment.

According to the on-vehicle control device 1 of the first embodiment, in a state where the value of the current flowing through the power path 80 is smaller than the threshold Ith, blocking by the relay 10 is prioritized, and in a state where the value of the current flowing through the power path 80 is larger than the threshold Ith, blocking by the block unit 11 is prioritized. Moreover, in a state where the value of the current flowing through the power path 80 is larger than the threshold Ith, the degree of decrease of time of the first blocking characteristic BC1 is smaller in the second current value range R2 than in the first current value range R1. Therefore, a maximum value of the current flowing through the power path 80 can be increased without changing the second blocking characteristic BC2 for blocking the relay 10. Therefore, it is possible to allow a larger current to flow while suppressing an increase in size of the relay 10.

Furthermore, the threshold Ith is a value between the upper limit value of the first current value range R1 and the lower limit value of the second current value range R2. With this configuration, the time of the first blocking characteristic BC1 can be decreased with the second degree of decrease in the range of the current value in which blocking by the relay 10 is prioritized, and the time of the first blocking characteristic BC1 can be decreased with the third degree of decrease in the range of the current value in which blocking by the block unit 11 is prioritized. Therefore, in the range of the current value in which blocking by the relay 10 is prioritized, blocking by the block unit 11 can be prevented from being erroneously performed first. In addition, in the range of the current value in which blocking by the block unit 11 is prioritized, the maximum value of the current value of the first blocking characteristic BC1 can be extended more greatly.

Furthermore, when the value of the current flowing through the power path 80 exceeds the second threshold Ith2 larger than the threshold Ith, the control unit 14 immediately switches the block unit 11 to the blocking state. With this configuration, the power path 80 can be immediately blocked in a case where a large current that should not be allowed flows even for a short time.

Furthermore, the relay 10 is a mechanical relay, and the block unit 11 is a semiconductor switching element. With this configuration, a configuration in which an increase in cost of the relay 10 can be suppressed and the degree of decrease of time of the first blocking characteristic BC1 changes according to the range of the current value can be provided more accurately by the block unit 11. In particular, in the first current value range R1, recovery after blocking may be expected. However, in the first current value range R1, the first blocking characteristic BC1 is largely separated from the second blocking characteristic BC2 as the current value decreases, so that blocking by the relay 10 is more reliably prioritized over blocking by the block unit 11. Accordingly, requirements for the recovery of the block unit 11 to the allowable state is reduced, and as a result, an increase in cost of the block unit 11 can be suppressed. Extremely speaking, it is possible to configure such that the block unit 11 does not return to the allowable state. In this case, any program or the like for returning the block unit 11 to the allowable state is not needed at all.

Furthermore, the first blocking characteristic BC1 and the second blocking characteristic BC2 are defined by a linear function having a current value and a time as variables. With this configuration, the data amount of the first blocking characteristic BC1 and the second blocking characteristic BC2 can be made small as compared with the configuration prescribed by the table method.

The present disclosure is not limited to the embodiment described with reference to the above description and drawings. For example, the features of the embodiments described above or below can be combined in any manner within a range not contradictory. In addition, any of the features of the embodiments described above or below can be omitted unless clearly indicated as being essential. Furthermore, the above-described embodiment may be modified as follows.

In the above embodiment, the on-vehicle control device includes the relay, the block unit, the current detection unit, and the second control unit. However, the on-vehicle control device may not include some of or all of these units.

In the above embodiment, the second control unit controls the relay, but the control unit may control the relay. In this case, it is not necessary to provide the second control unit in the on-vehicle system.

In the above embodiment, the relay is a mechanical relay, but may be a semiconductor relay.

In the above embodiment, the block unit is the semiconductor switching element, but the block unit is not necessarily the semiconductor switching element as long as the block unit can be switched to the off state by control. For example, the block unit may be a mechanical switch.

In the above embodiment, the block unit is configured to be capable of returning to the allowable state after being switched to the blocking state, but may be configured to be incapable of returning to the allowable state. As a configuration in which the block unit cannot return to the allowable state, for example, the block unit may be a circuit breaker that physically cut off a path by being given a control signal. More specifically, the block unit may be a pyrotechnic circuit breaker (for example, PYROFUSE®) that causes an explosion when a driving current is input, and physically cut off the path by moving the displacement portion by the explosion. Alternatively, the block unit may be configured as a switch but configured not to be controlled to return to the allowable state.

In the above embodiment, as the configuration in which "the block unit is immediately switched to the blocking state when the value of the current flowing through the power path exceeds the second threshold", the time corresponding to the current value exceeding the second threshold in the first blocking characteristic is set to 0 or substantially 0, but another configuration may be adopted. For example, the control unit may store the second threshold separately from the first blocking characteristic, and when the value of the current flowing through the power path exceeds the second threshold, the control unit may switch the block unit to the blocking state even though the time defined by the first blocking characteristic has not elapsed.

In the above embodiment, the first blocking characteristic and the second blocking characteristic are each defined by a linear function having a current value and a time as variables, but may be defined by a table indicating a correspondence relationship between a current value and a time.

It should be understood that the embodiment disclosed herein is illustrative in all respects and is not restrictive. The scope of the present disclosure is not limited to the embodiment disclosed herein, and is intended to include all modifications within the scope indicated by the claims or within the scope equivalent to the claims.

The invention claimed is:

1. An on-vehicle control device used in an on-vehicle system including a power source unit, a power path to which power based on the power source unit is supplied, a relay provided in the power path, and a block unit provided in the power path, the on-vehicle control device comprising:
a control unit that switches the block unit to a blocking state, wherein
the control unit prioritizes blocking by the relay in a state where a value of current flowing through the power path is smaller than a threshold and prioritizes blocking by the block unit in a state where the value of the current flowing through the power path is larger than the threshold, and wherein the control unit switches the block unit to the blocking state on a basis of a first blocking characteristic, the relay is turned off on a basis of a second blocking characteristic, the first blocking characteristic and the second blocking characteristic are characteristics defining a correspondence relationship between a current value and a time until blocking, in the second blocking characteristic, the time decreases with a first degree of decrease as the current value increases, in the first blocking characteristic, the time decreases with a second degree of decrease in a first current value range as the current value increases, and the time decreases with a third degree of decrease in a second current value range which is larger than an upper limit value of the first current value range as the current value increases, the second degree of decrease and the third degree of decrease are larger than the first degree of decrease, the third degree of decrease is smaller than the second degree of decrease, and the time is set to be longer in the first blocking characteristic than in the second blocking characteristic for the current value smaller than the threshold set between a lower limit value of the first current value range and an upper limit value of the second current value range, and the time is set to be shorter in the first blocking characteristic than in the second blocking characteristic for the current value larger than the threshold.

2. The on-vehicle control device according to claim 1, wherein the threshold is a value between an upper limit value of the first current value range and a lower limit value of the second current value range.

3. The on-vehicle control device according to claim 1, wherein the control unit immediately switches the block unit to the blocking state when a value of the current flowing through the power path exceeds a second threshold larger than the threshold.

4. The on-vehicle control device according to claim 3, wherein the relay is a mechanical relay, and the block unit is a semiconductor switching element.

5. The on-vehicle control device according to claim 3, wherein the block unit is a pyrofuse.

6. The on-vehicle control device according to claim 4, wherein the first blocking characteristic and the second blocking characteristic are defined by a linear function having the current value and the time as variables.

7. The on-vehicle control device according to claim 1, wherein the first blocking characteristic and the second blocking characteristic are defined by a linear function having the current value and the time as variables.

* * * * *